No. 654,042. Patented July 17, 1900.
J. A. YOUNG.
METHOD OF FASTENING METALLIC PARTS TOGETHER.
(Application filed Jan. 10, 1900.)
(No Model.)
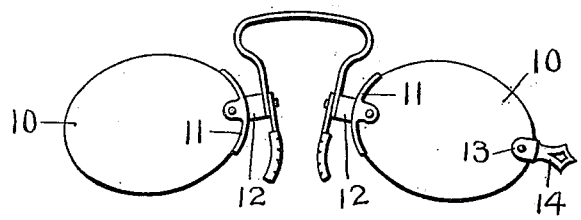
Fig. 1.
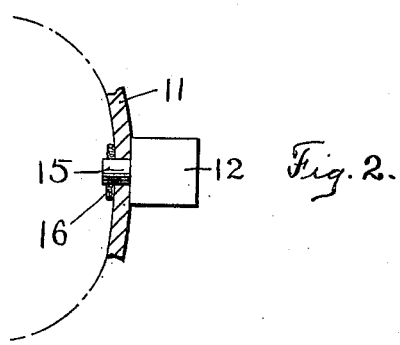
Fig. 2.
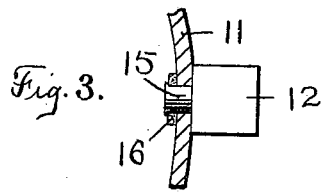
Fig. 3.
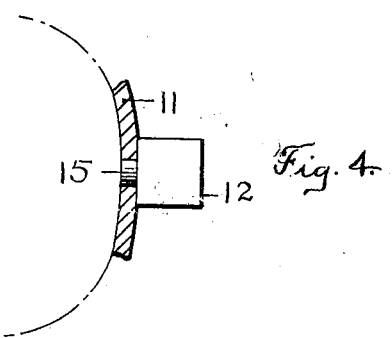
Fig. 4.
Fig. 5.
Witnesses.
W. J. Baldwin
M. O. Regan
Inventor.
J. A. Young,
By
Southgate & Southgate
Attorneys.

UNITED STATES PATENT OFFICE.

JOHN A. YOUNG, OF SOUTHBRIDGE, MASSACHUSETTS, ASSIGNOR TO THE AMERICAN OPTICAL COMPANY, OF SAME PLACE.

METHOD OF FASTENING METALLIC PARTS TOGETHER.

SPECIFICATION forming part of Letters Patent No. 654,042, dated July 17, 1900.

Application filed January 10, 1900. Serial No. 942. (No model.)

*To all whom it may concern:*

Be it known that I, JOHN A. YOUNG, a citizen of the United States, residing at Southbridge, in the county of Worcester and State of Massachusetts, have invented a new and useful Method of Fastening Metallic Parts Together, of which the following is a specification.

This invention relates to an improved method for fastening or soldering together metallic parts or pieces; and the object of this invention is to cheapen, simplify, and improve the methods now employed for fastening or soldering together the small parts or pieces employed, for example, in spectacle or eyeglass frames, in jewelry-work, and in similar places; and the especial object of this invention is to provide a method of fastening or joining together metallic parts or pieces which will not require the separate application of heat to each joint.

To these ends the invention consists of the method as hereinafter described, and more particularly pointed out in the claims at the end of this specification.

For the purpose of illustration the accompanying drawings illustrate an ordinary form of eyeglass and shows, in enlarged scale, the application of this invention in securing a block to the lens-piece of an eyeglass-frame.

In the drawings, Figure 1 is a front view of an ordinary pair of eyeglasses. Fig. 2 is an enlarged detail view illustrating the manner in which two parts are put together and the solder washer applied. Fig. 3 is a similar view showing the end of the dowel or pin headed over to hold the parts together. Fig. 4 is a similar view illustrating the completed joint, and Fig. 5 is a detail perspective view of one of the solder washers.

One of the most difficult operations in optical or jewelry work, such as the manufacture of spectacle or eyeglass frames, is the soldering together of the small parts necessarily employed. In securing two small parts—for example, in constructing an eyeglass-frame—it is now customary to provide one of the parts with a pin or dowel which is long enough to extend through the other part or piece and project far enough simply to provide sufficient metal for upsetting or heading down. After the parts are fitted together and secured by heading over the dowel-pin it is now customary to solder each pair of pieces or joints by a separate operation—that is to say, after the parts are riveted together a soldering fluid or flux is applied to the joint, and small pieces of solder are picked up and put in position by a fine brush, and the blowpipe or similar flame is then used to solder the joint. The soldering of joints in this manner is a tedious and expensive operation, requiring the highest grade of skilled labor, the excellence of the joint secured varying greatly with the degree of care exercised.

The especial object of the present invention is to dispense with an individual heating of each joint and to provide a method of applying solder which will not only permit of a simultaneous heating of several sets of pieces which are to be joined, but which will produce joints of absolute uniformity and strength. To accomplish this object, the pin or dowel extending from one of the parts is made long enough to project into and preferably some distance through the other part, and before the parts are riveted together a small wedge, piece, partial circle, or washer of solder is placed upon the pin or dowel, so that when the end of the pin or dowel is headed over the parts and solder will be secured together, so that a plurality of sets of pieces so joined may be handled and headed simultaneously, after which the projecting inner end of the dowel-pin may be finished off and surplus solder removed in the ordinary manner, leaving a clean joint, which is thus produced at less expense than has heretofore been practicable.

Referring to the drawings, it is to be understood that my invention is shown applied to forming the joints of an eyeglass-frame for the purpose of illustration merely, my method of forming joints being equally applicable to many other articles.

In the drawings the eyeglasses illustrated in Fig. 1 are of any ordinary or approved construction, and comprise lenses 10, carried by lens-pieces 11, to which lens-pieces the blocks 12, which receive the screws securing the spring and nosepieces in place, are fastened or soldered according to my invention. One of the lenses 10 is provided with an end piece 13, to which a handle 14 may also be fastened or soldered by my method, so that in the eyeglasses illustrated three joints may be formed according to my invention, although a greater or less number of joints in an eyeglass or spectacle frame may be soldered or secured according to my invention, depending upon the special style of frame.

Figs. 2 to 4 illustrate the successive steps in practicing my invention. As shown in Fig. 2, the block 12 is provided with a dowel or pin 15, which is first fitted through the lens-piece 11 and a solder washer 16 then placed thereon. The head of the pin or dowel 15 is next upset or headed, holding the solder washer in place and securing the parts together, as illustrated in Fig. 3. A suitable soldering flux or fluid—such, for example, as a solution of sal-ammoniac thickened with borax—is next applied to the joint and the joint is then heated, preferably a plurality of joints being heated at the same time. To heat the joints so as to melt the solder washers, I preferably spread the parts or pieces upon an iron plate or similar surface and direct the flame from a large forced-draft lamp thereon, although, if preferred, the parts may be heated in ovens or in other desired ways. I prefer to heat the parts while they are spread upon an iron plate or metallic surface, because I have found in practice that when thus heated the several joints are less liable to become stuck or accidentally soldered together than when heated in quantities in a furnace. In thus heating the joints the solder is melted and flows in around the dowel or pin 15, forming a much more perfect connection than is possible by the hand methods of soldering as heretofore practiced, and after the parts have been soldered together the projecting end of the pin or dowel 15 and the surplus solder may be cut off or removed in any ordinary manner, leaving the joint as illustrated in Fig. 4.

In the drawings I have shown a complete circle or washer of solder; but it is obvious, however, that partial solder rings or pieces that can be wedged into or otherwise secured to the dowel may be employed, if desired, the essential feature of my invention consisting in combining the solder with the dowel or pin in such a manner that the solder will be held in place and the parts secured together by heading the pin.

I am aware that changes may be made in the practice of my invention by those who are skilled in the art, and I do not wish, therefore, to be limited to the details of operation herein described; but What I do claim, and desire to secure by Letters Patent of the United States, is—

1. The method of fastening together metallic pieces, one of which is provided with a pin projecting into the other piece, which consists in fitting a piece of solder onto the pin, heading over the pin to hold the solder washer in place and secure the parts together, so that a plurality of sets of such pieces may be handled at the same time, and then melting the solder, substantially as described.

2. The method of fastening together metallic pieces, one of which is provided with a pin projecting through the other piece, which consists in fitting a solder washer onto the pin, heading over the pin to hold the solder washer in place and secure the parts together, so that a plurality of such pieces may be handled at the same time, applying a soldering fluid or flux, melting the solder washer, and then removing the projecting end of the pin and the surplus solder, substantially as described.

In testimony whereof I have hereunto set my hand in the presence of two subscribing witnesses.

JOHN A. YOUNG.

Witnesses:
LOUIS W. SOUTHGATE,
PHILIP W. SOUTHGATE.